(12) United States Patent
Mattle (10) Patent No.: US 12,312,794 B2
(45) Date of Patent: May 27, 2025

(54) SYSTEM FOR THE CONTROL OF A FLOW OF LIQUID BETWEEN A FIRST RESERVOIR AND A SECOND RESERVOIR

(71) Applicant: MATTLE NATUR & ANLÆG APS, Vejen (DK)

(72) Inventor: Christian Mattle, Vejen (DK)

(73) Assignee: MATTLE NATUR & ANLÆG APS, Vejen (DK)

( * ) Notice: Subject to any disclaimer, the term of this patent is extended or adjusted under 35 U.S.C. 154(b) by 24 days.

(21) Appl. No.: 18/577,124

(22) PCT Filed: Jul. 7, 2022

(86) PCT No.: PCT/EP2022/068925
§ 371 (c)(1),
(2) Date: Jan. 5, 2024

(87) PCT Pub. No.: WO2023/280985
PCT Pub. Date: Jan. 12, 2023

(65) Prior Publication Data
US 2024/0209615 A1 Jun. 27, 2024

(30) Foreign Application Priority Data

Jul. 8, 2021 (EP) .................................. 21184532
Aug. 12, 2021 (EP) .................................. 21191093

(51) Int. Cl.
*F16K 21/18* (2006.01)
*E03F 5/10* (2006.01)

(52) U.S. Cl.
CPC .............. *E03F 5/107* (2013.01); *F16K 21/18* (2013.01)

(58) Field of Classification Search
CPC ........... F16K 31/22; F16K 21/18; E03F 5/107
See application file for complete search history.

(56) References Cited

U.S. PATENT DOCUMENTS

2017/0306607 A1* 10/2017 Moody .................... E03F 5/101
2020/0096131 A1* 3/2020 Czyszczon ................ E03F 7/04

FOREIGN PATENT DOCUMENTS

| DE | 2826034 A1 | 12/1979 |
| EP | 2307624 B1 | 11/2012 |
| EP | 2325407 B1 | 7/2019 |

OTHER PUBLICATIONS

WIPO/ISA/EPO, International Search Report and Written Opinion for corresponding application PCT/EP2022/068925 dated Oct. 14, 2022, 14 pages.

* cited by examiner

*Primary Examiner* — P. Macade Nichols
(74) *Attorney, Agent, or Firm* — J. Peter Paredes; Amin Wasserman Gurnani LLP (57) ABSTRACT

The invention relates to a system for controlling a flow of liquid from a first to a second reservoir (1,2). The system comprises an intermediate reservoir (4) having an inlet (5) in fluid communication with the first reservoir and an outlet (6) in fluid communication with the second reservoir. A valve (7) at the inlet moves between an open position in which liquid can flow from the first reservoir to the intermediate reservoir via the inlet and a closed position. The valve comprises a float (7a) that floats on liquid present in the intermediate reservoir and thereby controls the position of the valve dependent on the liquid level in the intermediate and second reservoirs. The closing is provided by the buoyant force of the float moving a closing surface (10) of the valve into a liquid tight engagement with the inlet thereby providing a liquid tight closure between the first and intermediate reservoirs.

17 Claims, 5 Drawing Sheets

SYSTEM FOR THE CONTROL OF A FLOW OF LIQUID BETWEEN A FIRST RESERVOIR AND A SECOND RESERVOIR

CROSS-REFERENCE TO RELATED APPLICATIONS

The present application claims priority to PCT application serial no. PCT/EP2022/068925 filed Jul. 7, 2022, which claims priority to European patent application serial no. 21184532.6, filed Jul. 8, 2021 and European patent application serial no. 21191093.0, filed Aug. 12, 2021, each herein incorporated by reference in their entireties.

FIELD OF THE INVENTION

The present invention relates to a system for the control of a flow of liquid between a first reservoir and a second reservoir. In particular, it relates to such as system comprising a float that is used to open and close a connection between the two reservoirs dependent on a predetermined minimum liquid level in the second reservoir.

BACKGROUND OF THE INVENTION

Recent climate changes have resulted in periods with heavy rain being more frequent, and this often causes problems with flooding which can be particularly problematic in cities where the sewer systems cannot contain the huge amounts of water present during heavy rain. At the same time, the drinking water resources decrease and this makes it necessary to save water.

Therefore, there is a desire to be able to collect rainwater and surface water and store it for later use e.g. for watering plants in parks instead of using the valuable drinking water. However, this is not as simple as it may sound, since new storage and distribution systems are to be build, typically in already highly populated areas. This often makes it necessary to transport the stored water over large distances.

The water regulation is further complicated by the fact that components typically used in water distribution systems are manufactured for use with clean water whereas rainwater and surface water typically contain impurities, such as sand and soil particles. This means that traditionally used valves often malfunction and do not work as intended for this purpose, because they are clogged, do not close tight, or wear out easily. It is therefore necessary to provide a system that is more suited for this purpose.

OBJECT OF THE INVENTION

It is an object of the present invention to provide a system for controlling a flow of liquid from a first reservoir to a second reservoir which system has a more reliable functioning than known systems.

It is an object of at least some embodiments of the present invention to provide a system which is free from mechanically connected mutually moving parts so that it is less prone to wear than known systems.

It is another object of at least some embodiments of the invention to provide such a system which can be used for liquid comprising impurities, such as for rainwater and surface water.

It is another object of at least some embodiments of the invention to provide such a system which is easier to inspect, clean, maintain and/or repair than known systems.

It is a further object of the present invention to provide an alternative to the prior art.

In particular, it may be seen as an object of the present invention to provide a system for controlling a flow of liquid between two reservoirs that solves the above mentioned problems of the prior art.

SUMMARY OF THE INVENTION

Thus, the above-described object and several other objects are intended to be obtained in a first aspect of the invention by providing a system for controlling a flow of liquid from a first reservoir to a second reservoir when the system is in use, the system comprising:
  an intermediate reservoir having an inlet configured to be in fluid communication with the first reservoir and an outlet configured to be in fluid communication with the second reservoir when the system is in use,
  a valve arranged at the inlet and configured to move between:
    an open position in which liquid can flow from the first reservoir to the intermediate reservoir via the inlet when the system is in use, and
    a closed position in which liquid cannot flow from the first reservoir to the intermediate reservoir when the system is in use,
  wherein the outlet is designed and arranged so that the liquid level in the intermediate reservoir is the same as in the second reservoir when the system is in use,
  wherein the valve comprises a float that is configured to float on liquid present in the intermediate reservoir when the system is in use and thereby control the position of the valve dependent on the liquid level in the intermediate and second reservoirs, and
  wherein the valve is configured to, when the system is in use:
    open the inlet when the liquid level in the intermediate and second reservoirs is below a predetermined level, and
    close the inlet when the liquid level in the intermediate and second reservoirs is at or above the predetermined level, the closing being provided by the buoyant force of the float moving a closing surface of the valve into a liquid tight engagement with the inlet thereby providing a liquid tight closure between the first and intermediate reservoirs.

The system has been developed for use in relation to water regulation between a first reservoir used for storage of rainwater and the second reservoir used for a controlled supply of water to e.g. plants or a lake so that an optimal use of the rainwater can be obtained. The first and second reservoirs can be arranged a large distance apart and be connected by sewer pipes. Hereby it becomes possible to place the typically larger first reservoir at locations where there is more space available and where it is out of sight for those visiting the location of use, such as a park or another urban area. However, the invention may also find use within other fields where it is desired to have a controllable flow of liquid between two reservoirs. When the first reservoir is used for temporary storage of rainwater, it is typically configured to collect the rainwater from e.g. neighbouring roofs and roads. Such collected rainwater may also be led to the first reservoir via sewer pipes or other types of suitable conduits. The water height in the first reservoir may e.g. be in the order of 0.5 to 1.5 m, and it is typically led towards the intermediate reservoir via at least one pipe extending to the inlet.

The outlet is typically arranged at a lower height than the inlet so that the mutual locations of the inlet and the outlet facilitate the opening of the valve.

The valve is preferably designed to provide the liquid tight closure also when the liquid comprises impurities, such as when the liquid is rainwater or surface water, by using the dimension and shape as well as at least one of the elasticity and wear resistance as design parameters for the inlet and a region adjacent to and comprising the closing surface of the valve. This may e.g. be ensured by using elastically deformable material that allows for deformation around small impurities. The parameter "wear resistance" is relevant, since the presence of hard impurities could scratch or otherwise damage the closing surface to an extent making it no longer possible the provide the liquid tight closure. A further advantage of the invention is that the closing surface is automatically flushed and thereby cleaned by the flow of liquid through the inlet. The simple design of the valve without any mutually moving parts except for the float also means that the valve is free from malfunctioning due to impurities in joints as is typically seen for known valves, if they are used for liquid comprising impurities, such as sand and soil.

In some embodiments of the invention, the valve comprises a closing member comprising the closing surface. Such a closing member may e.g. be a plate or disk made of elastically deformable material, such as rubber. Alternatively, the upper surface of the float itself may form the closing surface provided that the float is made from a material that allows for a liquid tight engagement with the inlet.

In presently preferred embodiments of the invention, the closing surface of the valve is facing upwards. In such presently preferred embodiments, the inlet is typically in the form of a downwardly facing pipe end having a horizontally oriented end surface, and the closing surface is a horizontally oriented matching surface of a larger size. Since the closing force is provided by the vertically upward buoyant force of the float, a horizontally oriented closing surface will provide the most efficient closing. The surfaces that have to engage in order to obtain the closing of the valve may be plane. However, the scope of protection also covers other shapes and orientations, such as equally inclined or curved surfaces as long as they have shapes which allow for the liquid tight engagement with the inlet.

In alternative embodiments to the ones described above and having an upwardly facing closing surface of the valve, the valve may be configured as a traditional anti-flooding valve comprising a closing mechanism providing the movement between the open and closed positions dependent on the liquid level in the intermediate and second reservoirs. Such a traditional anti-flooding valve is typically arranged e.g. in sewer systems and used to prevent sewer water from running into the buildings and cause flooding. Such flooding could e.g. happen if the water level in the sewer system raises beyond a given level. Anti-flooding valves can also be referred to as non-return valves, but since this term also covers valves not comprising a float, the term anti-flooding valves is used in the following. An example of such an embodiment will be shown in the figures. From this description it will be seen that in the present invention, the anti-flooding device is used in another way than traditionally.

The valve may be provided with an actuator that is configured to provide a force to the valve which counteracts at least part of the buoyant force so as to open the valve independently of the liquid level in the intermediate reservoir. This may e.g. be relevant, when the first reservoir is used as a storage of rainwater for controlled use in the watering of an area, such as a park, as described above. In such a use, it may be desired to obtain some free capacity in the first reservoir e.g. when heavy rain is forecast so that flooding can be avoided.

In systems having an actuator, the actuator may be configured to open the valve to intermediate positions between the open and the closed positions and thereby regulate a flow rate of the flow of liquid. Such embodiments can be used to adjust the regulation to a given need and to ensure that flooding around the second reservoir is avoided.

The actuator may be configured to be manually activated. Alternatively, the actuator may be configured to be activated by a remote control. Such a remote control can be performed via the internet, such as via an app that can be run on a mobile phone. Hereby it is e.g. possible to transfer liquid from the first reservoir to the second reservoir, when it is desired to free some capacity in the first reservoir as explained above. It will be a particular advantage to be able to do so by remote control when a large number of such systems are placed over a larger area, such as throughout a city. Such systems and the associated remote control capabilities can be referred to as forming part of smart cities.

In some embodiments of the invention, the float and/or the actuator, if present, is arranged at least partly in a frame providing guidance of the vertical movement of the float and/or the actuator. Hereby it is easier to install the system and to ensure a satisfactory functioning of the system during long-term use.

In embodiments comprising a frame, the frame may be removably connected to a lower region of the intermediate reservoir. Hereby it will be easier to inspect, clean and repair the system. This is particularly relevant in relation to regulating the flow of rainwater stored in the first reservoir to an area of use, e.g. in a park. Such systems will typically be placed in a manhole of several meters depth, and therefore it is much easier to lift the frame to ground level instead of performing the work down in the manhole. An example of a design of a removably connected frame will be shown in the figures.

In any of the embodiments described above, the inlet may be formed by or be configured to be connected to a pipe, such as a pipe having a diameter in the range of DN110 to DN160. Such diameters are typical presently used sizes of sewer pipes which are the kind of pipes that are typically used in relation to the application for which the invention was developed. However, for other applications, other types of pipes and other dimensions may be more relevant.

A system as described above may further comprise the first reservoir, the second reservoir, and at last one pipe extending between the first reservoir and the inlet and at least one pipe extending between the outlet and the second reservoir. If there is more than one pipe, these pipes may be arranged in series. At least some of the pipes may also be arranged in parallel e.g. to lead liquid, such as rainwater or surface water, from different locations towards the intermediate reservoir.

In a second aspect, the invention relates to a method of controlling a flow of liquid from a first reservoir to a second reservoir by use of a system according to any of the preceding claims. The liquid may be rainwater or surface water which is temporarily stored in the first reservoir for later transfer to the second reservoir.

The first and second aspect of the present invention may be combined. These and other aspects of the invention will be apparent from and elucidated with reference to the embodiments described hereinafter.

BRIEF DESCRIPTION OF THE FIGURES

The system according to the invention will now be described in more detail with regard to the accompanying figures. The figures show one way of implementing the present invention and is not to be construed as being limiting to other possible embodiments falling within the scope of the attached claim set.

FIGS. 2.*a*, 2.*b*, and 2.*c* show the liquid level in the intermediate reservoir being at three different heights. FIG. 2.*d* schematically show an alternative embodiment to the one in FIGS. 2.*a* to 2.*c*.

FIGS. 3.*a* and 3.*b* are two perpendicular side views, and FIGS. 3.*c* and 3.*d* are the respective top views.

DETAILED DESCRIPTION OF AN EMBODIMENT

The present invention has been developed for use in relation to demand-controlled supply of previously collected and stored rainwater to e.g. plants in a park. Hereby the rainwater can be used for watering plants instead of being wasted. Furthermore, the storage of the rainwater instead of letting it run into the sewers counteracts overloading of the sewer system and the sewage treatment works thereby preventing flooding during heavy rain. Such heavy rain is expected to occur more frequently in the future.

Figure 1:
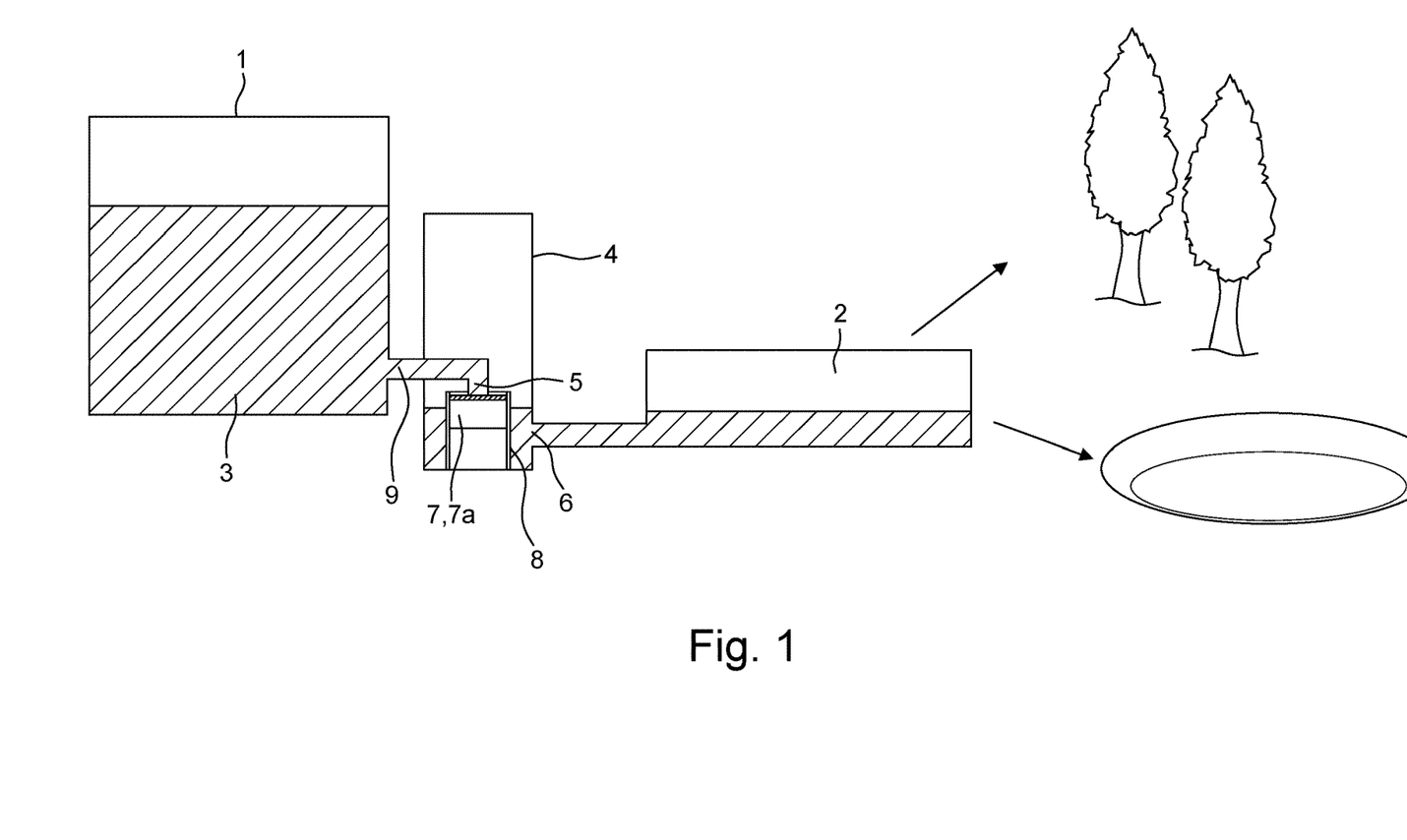
FIG. 1 schematically shows a system according to the invention arranged in fluid communication with a first reservoir and a second reservoir.

An example of such a system is schematically shown in FIG. 1. A first reservoir 1 is used for the storage of rainwater and surface water 3, and a second reservoir 2 is from where the water is used, e.g. by plants. The supply of the water from the second reservoir 2 to the plants can be done in different ways and will be known to a person skilled in the art. It may e.g. be via a system in which the water can move upwards by capillary forces driven by the plants using the water from a plant- or flowerbed arranged in connection with, such as above, the second reservoir. Between the first and second reservoirs 1,2 is placed an intermediate reservoir 4 which is connected thereto. The intermediate reservoir 4 may e.g. be a manhole located near the second reservoir 2 whereas the first reservoir 1 is typically placed at another location.

The invention is a system for controlling a flow of liquid, typically rainwater, from the first reservoir 1 to the second reservoir 2 when the system is in use, i.e. when it is arranged e.g. as shown in FIG. 1. The intermediate reservoir 4 has an inlet 5 being in fluid communication with the first reservoir 1 and an outlet 6 being in fluid communication with the second reservoir 2. The outlet 6 is designed so that the liquid level in the intermediate reservoir 4 is the same as in the second reservoir 2 when the system is in use. A valve 7 comprising a float 7*a* is arranged at the inlet 5 and configured to move between an open position and a closed position. In the open position, liquid can flow from the first reservoir 1 to the intermediate reservoir 4 via the inlet 5, and in the closed position, liquid cannot flow from the first reservoir 1 to the intermediate reservoir 4. The movement of the float 7*a* is preferably guided by guide elements 8, e.g. by having it placed inside a vertically extending pipe as shown in FIG. 1. The inlet 5 can e.g. be formed by or be configured to be connected to a sewer pipe 9, such as a sewer pipe having a diameter in the range of DN110 to DN160. In FIG. 1, the sewer pipe 9 forms the connection between the first reservoir 1 and the intermediate reservoir 4.

Figure 2:
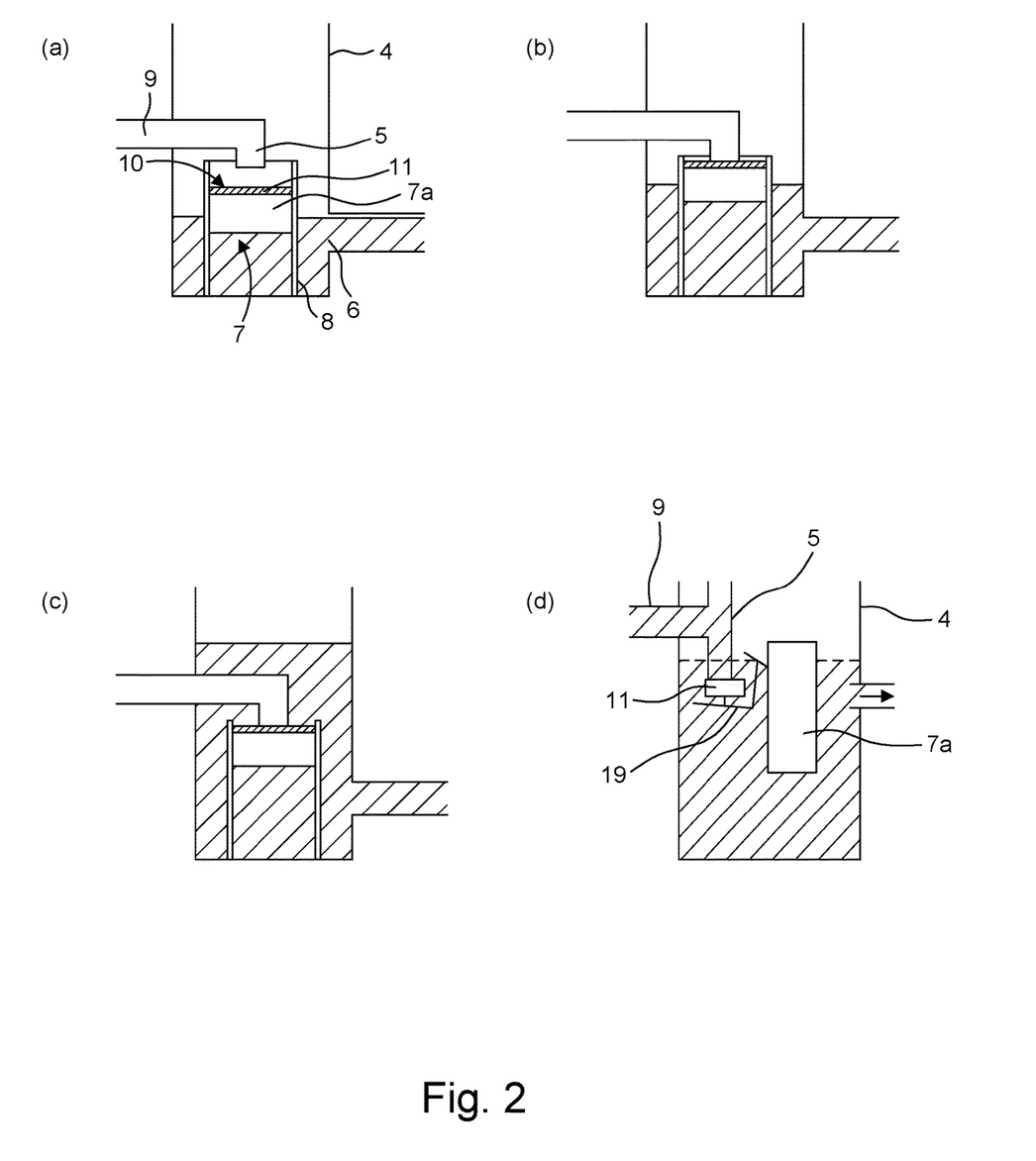
FIG. 2 schematically shows a close-up of the region around the valve of the system in FIG. 1.

FIG. 2 schematically shows an enlarged view of the region around the inlet 5. The valve 7 comprises a float 7*a* that is configured to float on liquid present in the intermediate reservoir 4 and thereby control the position of the valve 7 dependent on the liquid level in the intermediate and second reservoirs 4,2. FIG. 2.*a* shows the valve 7 in an open position, and FIG. 2.*b* shows the valve 7 in the closed position in which the upwardly oriented closing surface 10 is engaged with the inlet 5. FIG. 2.*c* shows the situation when the liquid level in the intermediate reservoir 4 is higher than in FIG. 2.*b* resulting in the closing surface 10 of the valve 7 being pressed against the inlet 5 by the buoyant force. The weight of the liquid above the valve 7 results in a downwards force on the free upper surface of the valve 7. Furthermore, the valve has to counteract the pressure caused by the liquid present in the first reservoir 1. The float 7*a* of the valve 7 should be designed to ensure that the buoyant force is larger than this resulting downward force so that the valve 7 remains closed when needed. A person skilled in the art would know how to perform the design calculations based on Archimedes' law, the dimensions and shapes of the relevant parts of the system and the density of the liquid. The float 7*a* should also be made from a material which can withstand wear due to possible friction between the guide elements 8 used to guide the vertical movement.

The valve 7 is configured to open the inlet 5 when the liquid level in the intermediate and second reservoirs 2,4 is below a predetermined level and to close the inlet 5 when the liquid level in the intermediate and second reservoirs 2,4 is at or above the predetermined level. The closing is provided by the buoyant force of the float 7*a* moving the upwardly facing closing surface 10 of the valve 7 into a liquid tight engagement with the inlet 5 thereby providing a liquid tight closure between the first and intermediate reservoirs 1,4. Thus, the predetermined level is the level at which the float 7*a* has moved downwards to a height resulting in the closure surface 10 no longer being in liquid-tight engagement with the inlet 5.

When the system is used for storage of rainwater or surface water as described above, the valve 7 should be designed to provide the liquid tight closure also when the liquid comprises impurities, such as sand and soil particles. As explained above, this can be obtained by using the dimension and shape as well as at least one of the elasticity and wear resistance as design parameters for the inlet 5 and a region adjacent to and comprising the closing surface 10 of the valve.

In the embodiments in FIGS. 2.*a* to 2.*b*, the valve 7 has a closing member 11 comprising the closing surface 10, i.e. the surface to be engaged with the inlet 5 in order to close it. The illustrated closing member 11 is a plate or disk made of elastically deformable material, such as rubber. The scope of protection also covers embodiments without guide elements 8. An example of such an embodiment is shown schematically in FIG. 2.*d*. In this embodiment, the float 7*a* is arranged offset from the inlet 5 and provided with a closing mechanism 19, e.g. in the form of a bracket, carrying a closing member 11 resembling the one shown in FIGS. 2.*a* to 2.*c* so that when the float 7*a* raises due to an increasing water level, the closing member 11 moves upwards towards and eventually closing the inlet 5.

Figure 3:
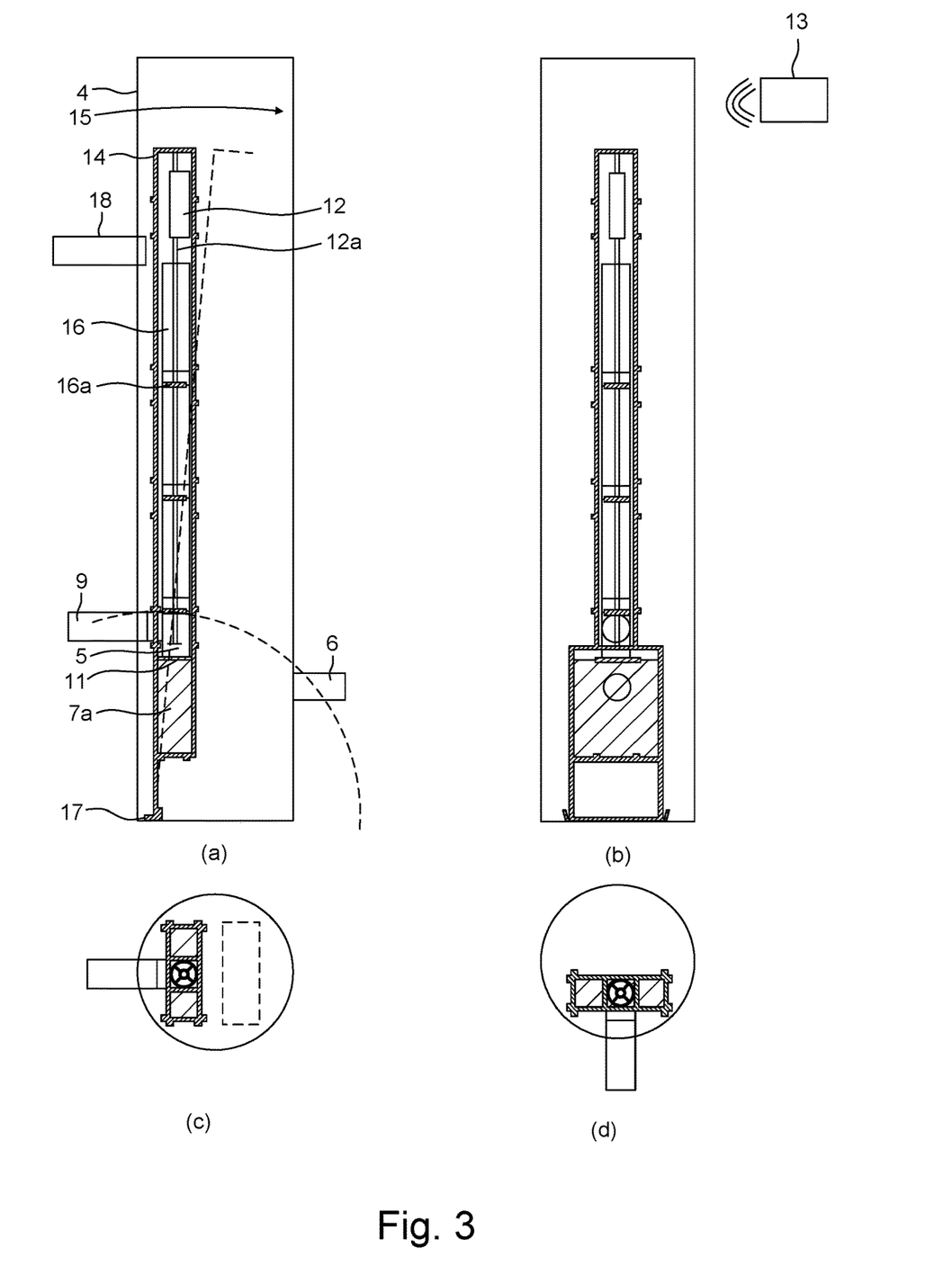
FIG. 3 schematically shows an embodiment of the invention in which the system comprises an actuator and a frame.

FIG. 3 schematically shows and embodiment in which the valve 7 is provided with an actuator 12 that is configured to provide a force to the valve 7 which counteracts at least part of the buoyant force so as to open the valve 7 independently of the liquid level in the intermediate reservoir 4. FIGS. 3.*a* and 3.*b* show perpendicular side views, and FIGS. 3.*c* and 3.*d* show the corresponding top views. The valve 7 is shown as having different dimensions in the two different directions, but it may also have the same dimensions, such as having a circular cross-section. By letting the float 7*a* extend sideways, a larger volume and thereby a larger buoyant force can be obtained for a given vertical dimension of the float 7*a*.

The illustrated actuator 12 has an actuator rod 12*a* extending down towards the closing surface of the valve 7 so that when the actuator rod 12*a* is moved downwards, it pushes the floating valve 7 away from the inlet 5. The actuator 12 can be configured to open the valve 7 to different intermediate positions between the uppermost and lowermost possible positions of the valve 7 so that is can be used to regulate a flow rate of the flow of liquid. As described in more details above, the actuator 12 may be configured to be manually activated, or it may be configured to be activated by a remote control 13. The remote control 13 in FIG. 3 is shown as sending signals wirelessly to the actuator 12. These signals will then activate the actuator 12 to move the valve 5.

In FIG. 3, the float 7*a* and actuator 12 are arranged in a frame 14 providing guidance of the vertical movement of the float 7*a* and the actuator 12. The frame 14 may e.g. be made from metal or plastic profiles. The frame 14 may be connected to an inner surface 15 of the intermediate reservoir 4 at or near an upper end to provide a more stable arrangement. The illustrated system is further provided with an actuator guide 16 arranged inside the frame 14 e.g. to protect the actuator rod 12*a* from sliding against the inner surfaces of the frame 14. This actuator guide 16 may e.g. be made from a vertically extending pipe, such as a sewer pipe corresponding to the one forming the inlet 5 and the connection 9 to the first reservoir 1. In the illustrated embodiment, the actuator guide 16 comprises horizontally oriented discs 16*a* providing additional guidance of the actuator rod 12*a* along its length. The illustrated frame 14 is removably connected to a lower region of the intermediate reservoir 4. As described above, such removal can e.g. be for easier inspection, cleaning and maintenance. The removal can be done by tilting the frame 14 sideways as shown schematically by the broken line in FIG. 3. Hereby the pipe forming the inlet 5 is disconnected from the pipe 9 extending towards the first reservoir 1.

Tests made during the development of the invention have shown that both the disconnection and the reconnection can be performed from the ground level without having to go down into the manhole forming the intermediate reservoir 4. As seen from the top views in FIGS. 3.*c* and 3.*d*, such a sideways tilting can be made possible by arranging the frame 14 offset from the longitudinal axis of the intermediate reservoir 4. It may be further facilitated by arranging the lower end of the frame 14 in a bent profile 17 providing support to the frame 14. As shown in FIG. 3.*a*, the intermediate reservoir 4 may also be provided with an upper overflow pipe 18 to ensure that the liquid level in the intermediate reservoir 4 does not increase above this level. This can be used to prevent flooding at the second reservoir 2 by transferring liquid from the overflow pipe 18 to a sewer. It can also be used to ensure that the valve 7 remains closed when desired, because the amount of liquid does not increase to an amount that would result in a downwards force large enough to open the valve 7.

Figure 4:
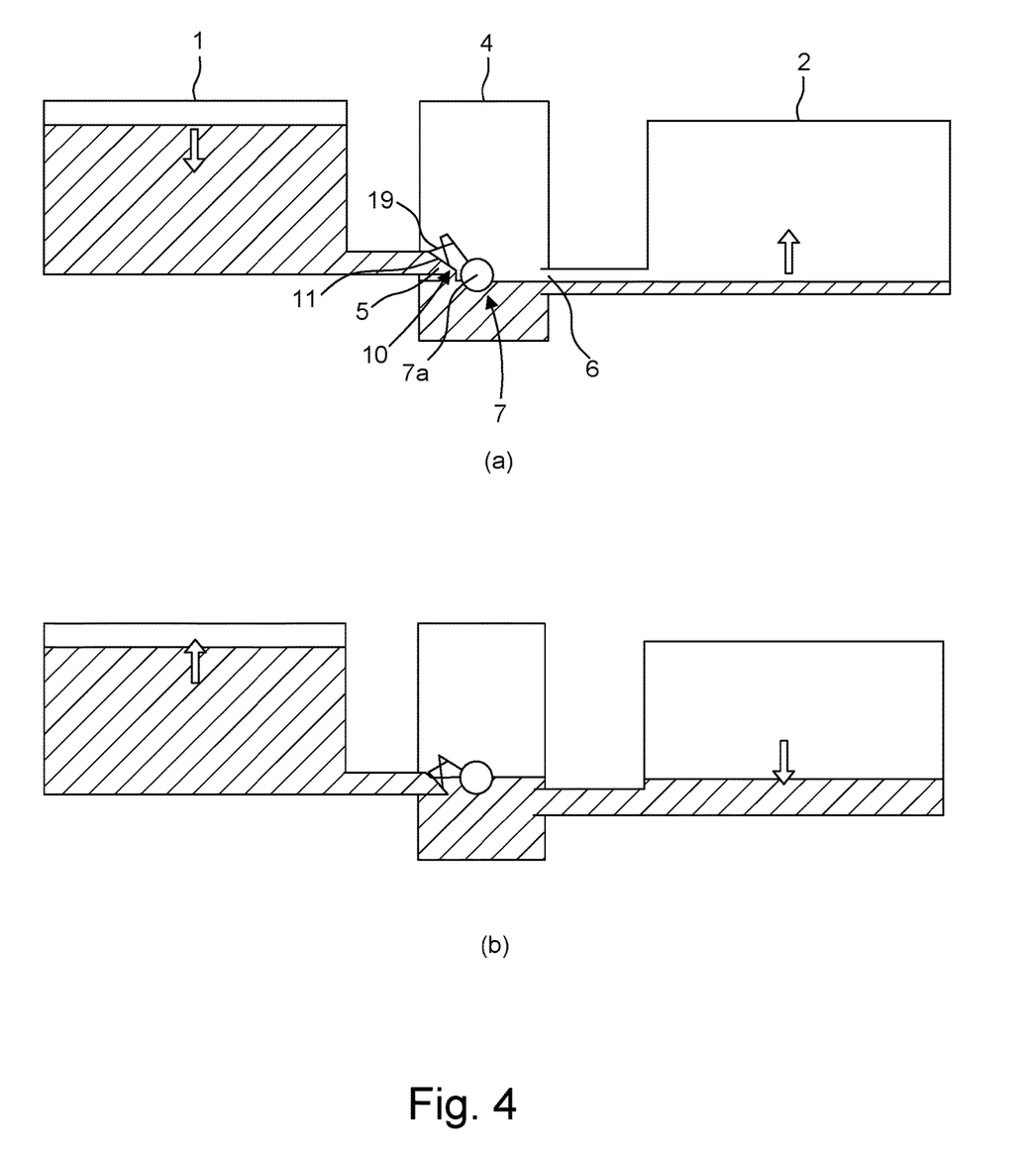
FIG. 4 schematically shows an alternative embodiment of the invention.

FIG. 4 schematically shows an alternative embodiment of the invention in which the valve is configured as an anti-flooding valve comprising a closing mechanism 19 providing the movement between the open and closed positions dependent on the liquid level in the intermediate and second reservoirs 4,2. The overall functioning of the system in FIG. 4 resembles the one described above and will therefore not be repeated. In the embodiment in FIG. 4, the closing surface 10 of the closing member 11 is arranged at an angle to vertical, and the inlet 5 into the intermediate reservoir 4 is shaped and oriented correspondingly in order to provide a liquid tight closure between the first and intermediate reservoirs 1,4 when the valve 7 is in the closed position. As mentioned above, such an anti-flooding valve is typically arranged e.g. in sewer systems and used to prevent sewer water from running into the buildings and cause flooding. Such flooding could e.g. happen if the water level in the sewer system raises beyond a given level. In relation to the present invention, the first reservoir 1, from which the liquid flows when the valve 7 is open, has a higher liquid level than the second reservoir 2. This is different from the traditional use of an anti-flooding valve, since here the aim is to avoid any significant amount of liquid in the first reservoir 1, this first reservoir e.g. being a building. The closing mechanism 19 of the anti-flooding valve may have different configurations which will be known on their own by a person skilled in the art. However, the way the anti-flooding valve is incorporated into the system of the present invention is new.

Figure 5:
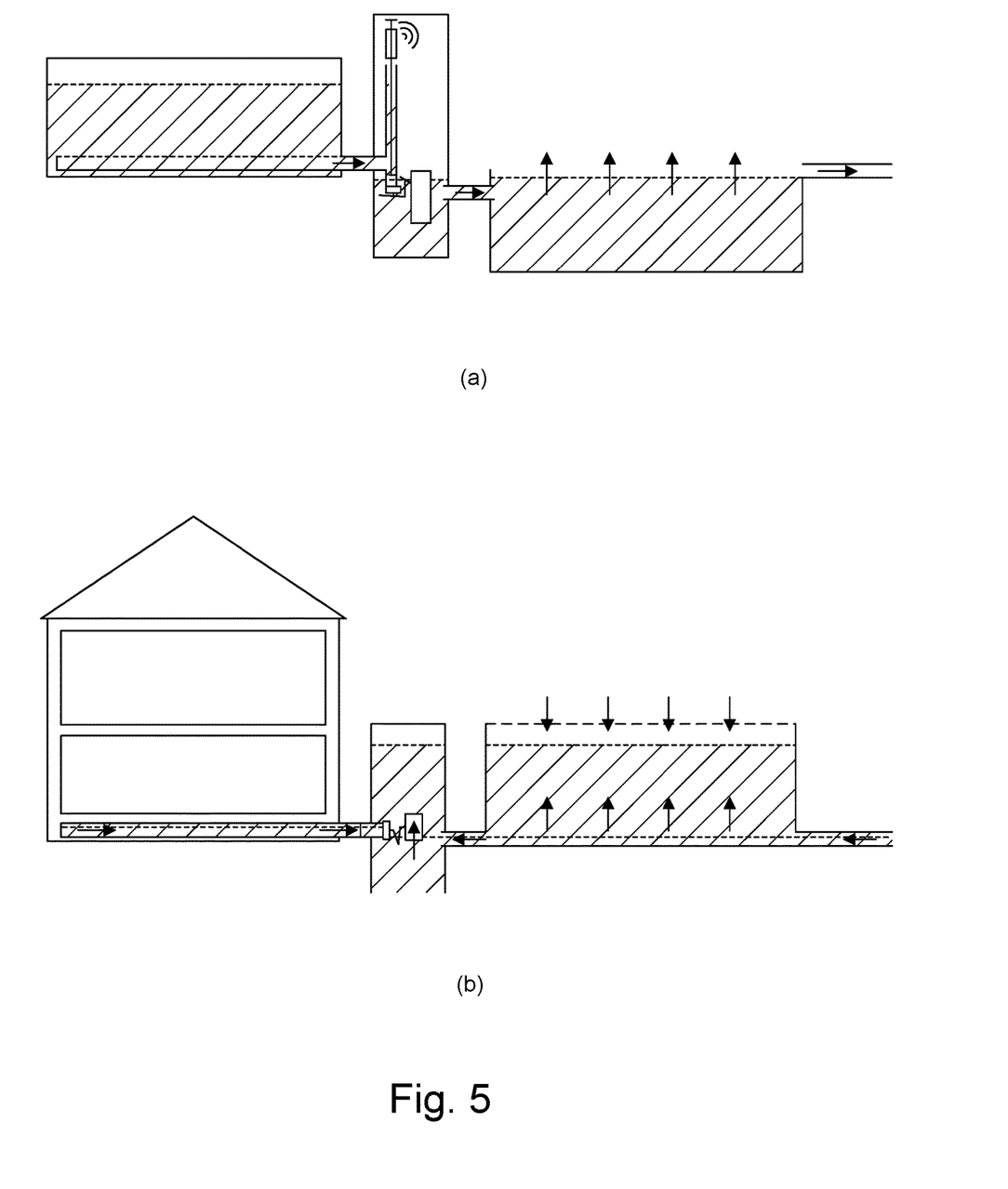
FIG. 5 schematically shows the difference between the present invention (FIG. 5.*a*) and a traditional use of an anti-flooding valve (FIG. 5.*b*).

The difference between a traditional use of an anti-flooding valve and the present invention is shown schematically in FIG. 5. FIG. 5.*a* shows the present invention as described above, and FIG. 5.*b* shows a traditional use of an anti-flooding valve arranged in a sewer system next to a building. In the present invention, the high-pressure side of the valve is to the left in the figure, i.e. in the first reservoir, and the low-pressure side is to the right, i.e. in the second reservoir. This is the opposite of the system in FIG. 5.*b* where the high-pressure side is to the right so that the anti-flooding valve closes, so that water from the sewer system does not flow into the house shown to the left.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps.

In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. System for controlling a flow of liquid from a first reservoir to a second reservoir when the system is in use, the system comprising:

an intermediate reservoir having an inlet configured to be in fluid communication with the first reservoir and an outlet configured to be in fluid communication with the second reservoir when the system is in use, a valve arranged at the inlet and configured to move between:
- an open position in which liquid can flow from the first reservoir to the intermediate reservoir via the inlet when the system is in use, and
- a closed position in which liquid cannot flow from the first reservoir to the intermediate reservoir when the system is in use, wherein the outlet is designed and arranged so that the liquid level in the intermediate reservoir is the same as in the second reservoir when the system is in use, wherein the valve comprises a float that is configured to float on liquid present in the intermediate reservoir when the system is in use and thereby control the position of the valve dependent on the liquid level in the intermediate and second reservoirs, and wherein the valve is configured to, when the system is in use:

open the inlet when the liquid level in the intermediate and second reservoirs is below a predetermined level, and close the inlet when the liquid level in the intermediate and second reservoirs is at or above the predetermined level, the closing being provided by the buoyant force of the float moving a closing surface of the valve into a liquid tight engagement with the inlet thereby providing a liquid tight closure between the first and intermediate reservoirs.

2. System according to claim 1, wherein the valve is designed to provide the liquid tight closure also when the liquid comprises impurities, such as when the liquid is rainwater or surface water, by using the dimension and shape as well as at least one of the elasticity and wear resistance as design parameters for the inlet and a region adjacent to and comprising the closing surface of the valve.

3. System according to claim 1, wherein the valve comprises a closing member comprising the closing surface.

4. System according to claim 3, wherein the closing member is a plate or disk made of elastically deformable material, such as rubber.

5. System according to claim 1, wherein the closing surface of the valve is facing upwards.

6. System according to claim 1, wherein the valve is configured as an anti-flooding valve comprising a closing mechanism providing the movement between the open and closed positions dependent on the liquid level in the intermediate and second reservoirs.

7. System according to claim 1, wherein valve is provided with an actuator that is configured to provide a force to the valve which counteracts at least part of the buoyant force so as to open the valve independently of the liquid level in the intermediate reservoir.

8. System according to claim 7, wherein the actuator is configured to open the valve to intermediate positions between the open and the closed positions and thereby regulate a flow rate of the flow of liquid.

9. System according to claim 7, wherein the actuator is configured to be manually activated.

10. System according to claim 8, wherein the actuator is configured to be activated by a remote control.

11. System according to claim 10, wherein the remote control can be performed via the internet, such as via an app that can be run on a mobile phone.

12. System according to claim 1, wherein the float and/or the actuator, if present, is at least partly arranged in a frame providing guidance of the vertical movement of the float and/or the actuator.

13. System according to claim 12, wherein the frame is removably connected to a lower region of the intermediate reservoir.

14. System according to claim 1, wherein the inlet is formed by or is configured to be connected to a pipe, such as a pipe having a diameter in the range of DN110 to DN160.

15. System according to claim 1, further comprising:
the first reservoir,
the second reservoir, and
at least one pipe extending between the first reservoir and the inlet and at least one pipe extending between the outlet and the second reservoir.

16. Method of controlling a flow of liquid from a first reservoir to a second reservoir by use of a system according to claim 1.

17. Method according to claim 16, wherein the liquid is rainwater or surface water which is temporarily stored in the first reservoir for later transfer to the second reservoir.

* * * * *